Oct. 2, 1928.  
J. L. OPITZ  
1,686,170  
DETACHABLE STEERING MECHANISM FOR TRACTORS  
Filed Dec. 23, 1924

Inventor  
John L. Opitz  
by Owing E Hagu Attys.

Patented Oct. 2, 1928.

1,686,170

UNITED STATES PATENT OFFICE.

JOHN LOUIS OPITZ, OF CLARINDA, IOWA.

DETACHABLE STEERING MECHANISM FOR TRACTORS.

Application filed December 23, 1924. Serial No. 757,663.

The object of my invention is to provide a simple, durable and inexpensive steering mechanism for tractors, especially designed to be used in place of the regular steering mechanism.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
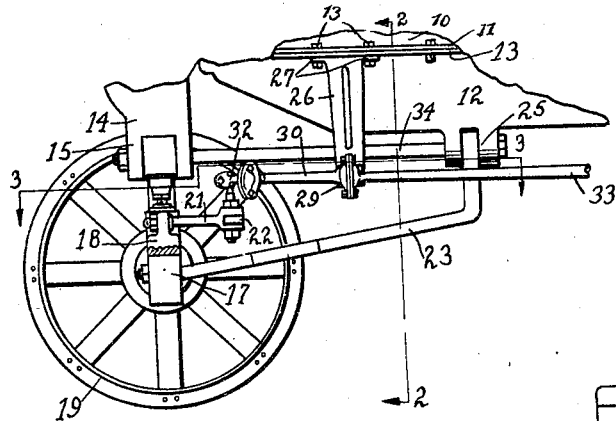
Figure 1 is a side elevation of my improved steering mechanism with one of the front wheels removed.
Figure 3:
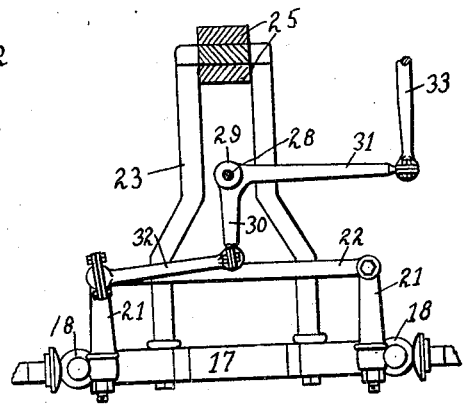
Figure 3 is a detail sectional view taken on the line 3—3 of Figure 1.
Figure 2:
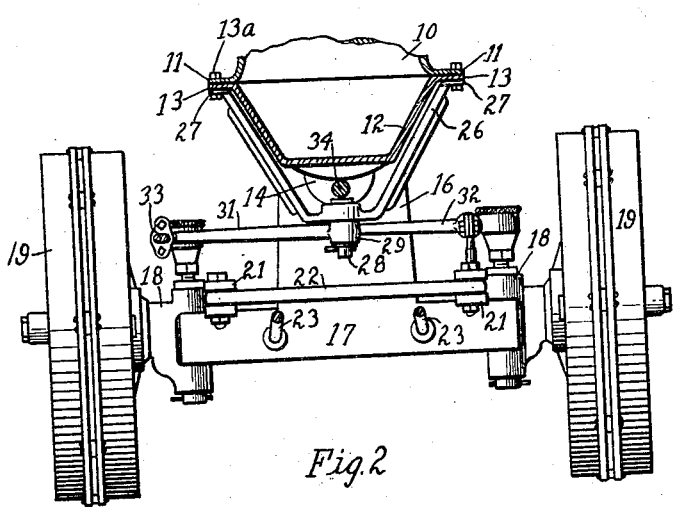
Figure 2 is a transverse sectional view taken on the line 2—2 of Figure 1.

The numeral 10 indicates the lower end of an engine block of a tractor, the lower edges of the sides of which are provided with outwardly extending flanges 11. A crank pan 12 is mounted beneath the block 10 having its upper edges provided with outwardly extended flanges 13 which are secured to the flanges 11 by means of bolts 13$^a$.

At the forward end of the block 10 is a radiator supporting bracket 14, the lower edge of which is provided with a pair of spaced downwardly extended lugs 15, between which an upright support 16 is pivotally mounted. The lower end of the support 16 is formed integral with the front axle 17. Each end of the axle 17 is provided with the usual spindle 18 on which the front wheels 19 are mounted. Each of the spindles 18 is provided with a rearwardly extended steering arm 21, said arms being connected by means of a steering link 22. A U-shaped radius rod 23 is provided for the axle 17, and which extends rearwardly and is provided with an upwardly extended portion 24 pivotally mounted between downwardly extended lugs 25 in the lower side of the pan 12.

For operating the steering link 22, I have provided a substantially U-shaped bracket 26, each of the free ends of which is provided with an outwardly extended flange 27. The member 26 is designed to surround the lower portion of the pan 12 and to have the flanges 27 rest adjacent to the under surface of the flanges 13. The flanges 17 are of sufficient length so as to engage two bolts 13$^a$ of the flanges 11, thereby providing means whereby the bracket 26 may be attached without drilling any extra holes.

The lower end of the bracket 26 is provided with a downwardly extended pivot pin 28 on which is pivotally mounted a bell crank lever 29 provided with a forwardly extending portion 20 and a laterally extending portion 31. The forward end of the portion 30 is pivotally connected to a link 32, one end of which is pivotally connected to one of the arms 21. The member 31 of the bell crank 29 is pivotally connected to a drag link 33 which extends rearwardly to the usual steering mechanism. The link 33 is also of the ordinary construction.

By this arrangement it will be seen that I have provided means whereby the axle 17 may be easily and quickly attached or detached by removing the pivot pin 34 which extends through the lugs 15 and 25, and by removing the bracket 26, then disconnecting the member 31 from the link 33, after which the usual axle and steering mechanism may be placed in position if so desired.

The bracket 26 provides means for rigidly and firmly mounting the bell crank 29 to the main frame of the tractor to which the steering wheel is also mounted. This provides means whereby any movement of the steering mechanism will be positively imparted to the link 22.

I claim as my invention:

1. In combination, a tractor frame having outwardly extending flanges designed to carry a detachable pan which is also provided with flanges to rest adjacent to the first said flanges, bolts for securing the said flanges together, an axle pivotally mounted to said frame, spindles pivoted to said axle, each of which is provided with a steering arm, a link for connecting said arms, means for imparting movement to said link comprising a substantially U-shaped bracket designed to surround said pan, the end of each member of said bracket being provided with a flange designed to rest beneath the flanges of said detachable pan and secured thereto by the bolts in said flanges, the lower portion of said U-shaped bracket being provided with a downwardly extending pivot pin, a lever pivotally mounted on said pin, a link for connecting one end of said lever to said steering link, and means for connecting the opposite lever with the steering mechanism of a tractor.

2. A steering mechanism for tractors comprising a bracket having a horizontal body portion terminating in upwardly and outwardly inclined portions, the free end of each of said portions terminating in horizontal flanges, each of said flanges being provided with bolt holes, the horizontal portion of said body portion having a downwardly extending pin, a bell crank lever pivotally mounted on said pin, a link for operatively connecting one end of said bell crank lever with the steering mechanism of a tractor, and a link pivotally connected with the other end of said bell crank lever for operatively connecting the bell crank lever with the mechanism for operating the steering mechanism.

3. A steering mechanism for tractors comprising a bracket having a horizontal body portion terminating in upwardly and outwardly inclined portions, the free end of each of said portions terminating in horizontal flanges, each of said flanges being provided with bolt holes, the horizontal portion of said body portion having a downwardly extending pin, a bell crank lever pivotally mounted on said pin, means for operatively connecting one end of said bell crank lever with the steering mechanism of a tractor, and means for pivotally connecting the other end of said bell crank lever with mechanism for operating the steering mechanism.

Des Moines, Iowa, October 8, 1924.

JOHN LOUIS OPITZ.